Jan. 1, 1924
E. GREGORY
MACHINE FOR MAKING GLASS SHEETS
Filed Sept. 15, 1921  2 Sheets-Sheet 2
1,479,295
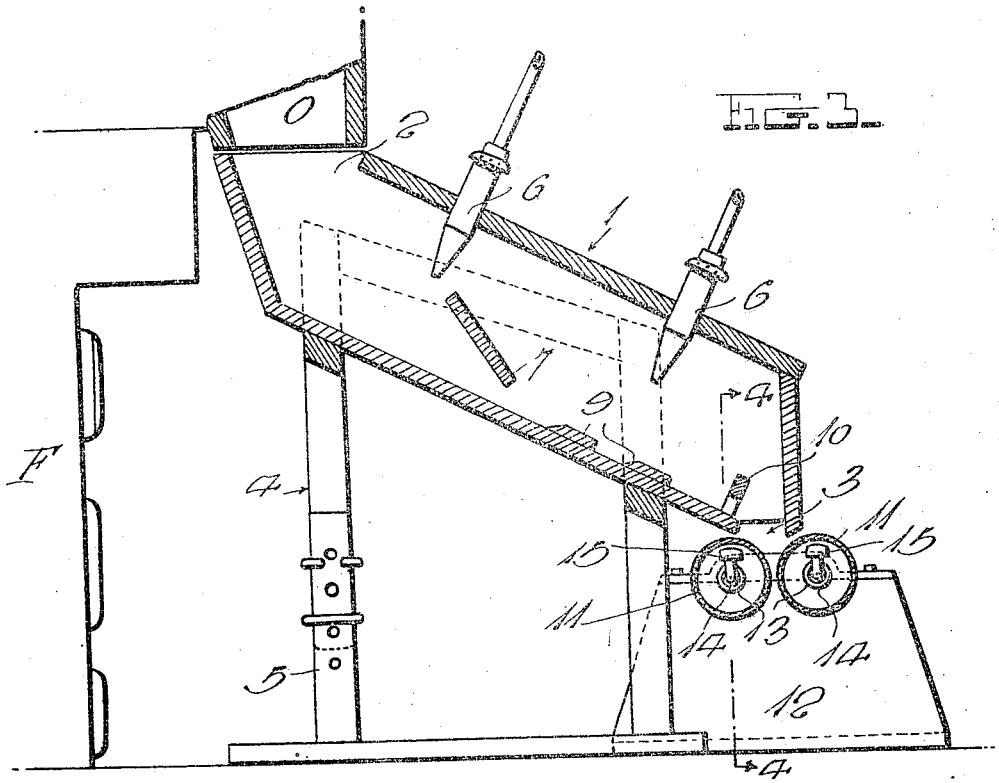
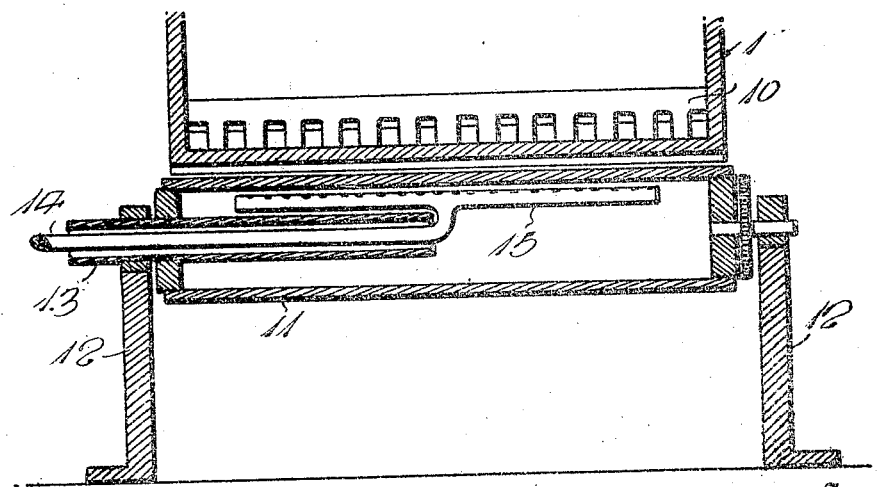
Inventor
E. GREGORY
Witness
H. Woodard
By H. R. Willson & Co.
Attorneys Patented Jan. 1, 1924.

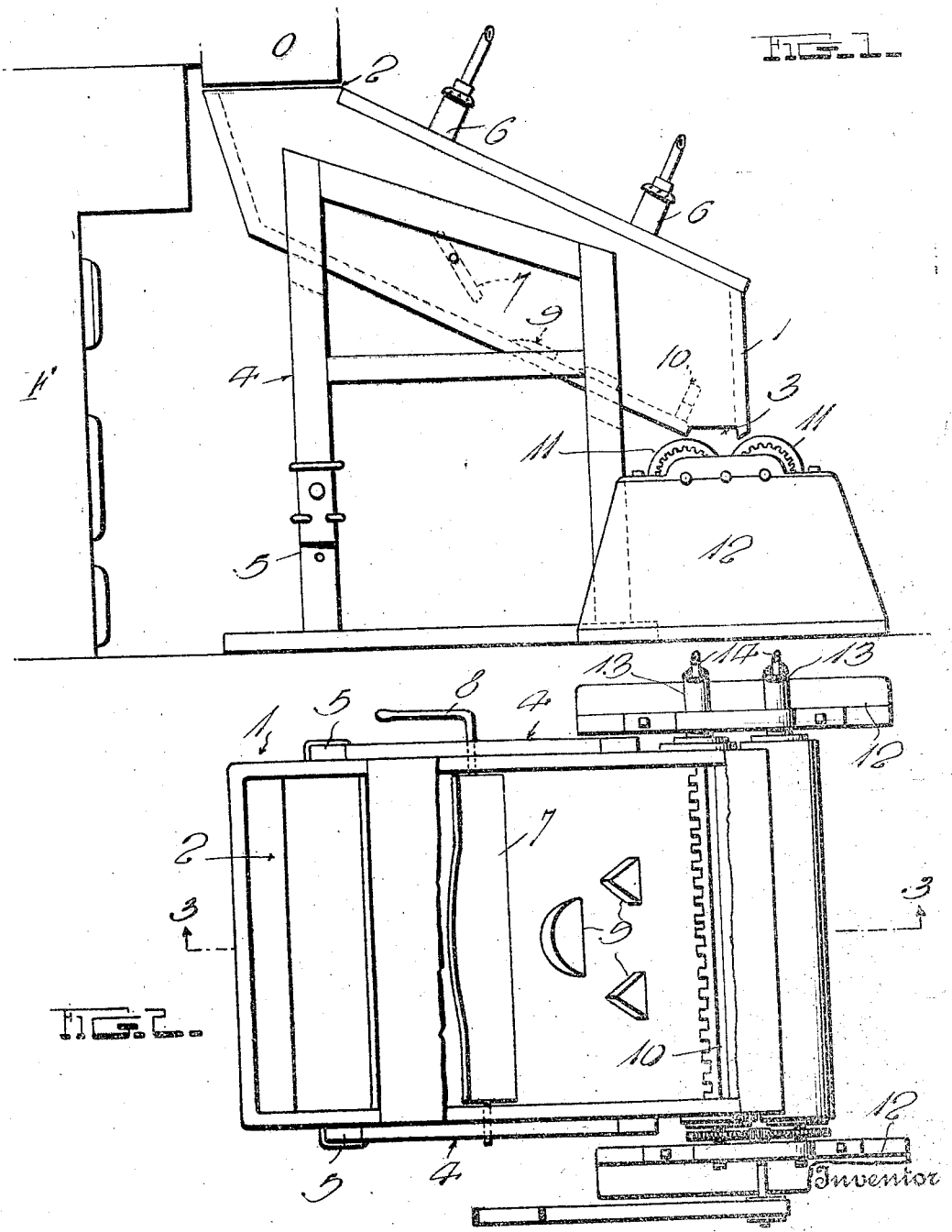

1,479,295

UNITED STATES PATENT OFFICE.

EDWARD GREGORY, OF NEW EAGLE, PENNSYLVANIA.

MACHINE FOR MAKING GLASS SHEETS.

Application filed September 15, 1921. Serial No. 500,735.

*To all whom it may concern:*

Be it known that I, EDWARD GREGORY, a citizen of the United States, residing at New Eagle, in the county of Washington and State of Pennsylvania, have invented certain new and useful Improvements in Machines for Making Glass Sheets; and I do declare the following to be a full, clear, and exact description of the invention, such as will enable others skilled in the art to which it appertains to make and use the same.

This invention relates to an improved machine which is designed for making glass sheets, and it has for its principal object to devise a machine which is such in construction that it permits manufacturers of glass sheets to produce the latter by a rolling process instead of by the ordinary method of blowing the glass into cylindrical forms and splitting the same, after which they must necessarily be flattened into sheets.

Another object of the invention is to provide a glass making machine of this class which embodies an inclined chute through which the molten glass passes, there being heating means extending into the chute and acting on the molten glass to insure that it will be kept in a liquid shape while flowing downwardly through the chute, together with novel means arranged at an advantageous point for equally distributing the molten glass over the entire surface of the bottom of the chute so that it will be properly thinned before being discharged from the chute.

Another object of the invention is to provide a machine of this class embodying the aforesaid structure together with two or more water cooled rollers positioned at the discharge end of the chute for flattening and cooling the glass as it passes between them.

Another object of the invention is to provide especially constructed cooling rollers wherein a spraying device is arranged inside of the roller and feeds a continuous spray of cold water against an advantageous point of the roller for effectively cooling the hot glass, together with a discharge pipe which has the additional function of forming one of the journals for the roller in which it is positioned.

Other objects and advantages of the invention will be apparent during the course of the following description.

In the accompanying drawings forming a part of this specification and in which like numerals are employed to designate like parts throughout the same:

Figure 1 is a side elevational view of a glass making machine constructed in accordance with this invention.

Figure 2 is a top plan view thereof with a portion of the cover plate of the chute broken away to disclose the internal details of the chute more clearly.

Figure 3 is a central longitudinal vertical sectional view taken substantially on the plane of the line 3—3 of Fig. 2.

Figure 4 is an enlarged detail section taken substantially on the plane of the line 4—4 of Fig. 3.

In carrying out the invention, I make use of a chute 1 of suitable shape and size, the same being preferably substantially rectangular and made up of a plurality of fire-proof clay slabs which are shaped and cut to provide an inlet 2 at one end and a discharge 3 at the opposite end. The chute is supported in an inclined position by means of a suitable supporting frame 4 which includes adjustable legs 5 for varying the degree of inclination of the chute. Referring to the chute again, it will be seen that the top plate thereof is formed with a plurality of openings through which gas jets 6 or other suitable heating devices are extended for the purpose of maintaining the molten glass in a liquid state as it flows downwardly through the chute. It is desirable to control the flow of glass through the chute and I therefore make use of a valve 7 which extends transversely across the chute and is equipped with a crank handle 8 for the purpose of varying the flow of glass. To render the device extremely effective, it is desirable to insure that the flowing mass will be uniformly distributed over the entire inner surface of the bottom of the chute, and I therefore employ a plurality of spaced baffles or deflecting members 9 which are secured to the bottom of the chute and arranged somewhat close to the discharge opening. It is to be noted that these baffles are shaped to insure proper deflection of the molten glass, and are spaced apart to permit the glass to flow between them so that the glass will not be deflected in masses towards the opposite sides of the chute as would otherwise occur. When the liquid glass leaves the chute it passes through a novel device which causes it to pass through the outlet in jets. The means for accomplishing this end consist preferably of a toothed bar 10 which is secured to the bottom of the chute and extends transversely between the sides and is disposed adjacent the discharge opening 3.

The invention in addition to embodying the parts so far described includes a pair of horizontally disposed parallel rollers 11 which are rotatably mounted on suitable supports 12. These rollers are spaced slightly apart for passage of the liquid glass between them and a cooling medium is circulated inside of them for the purpose of cooling their outer surface and in turn cooling the liquid mass which passes between them and is eventually formed into glass sheets after being cooled to the desired degree.

The cooling rollers which I make use of are novel in construction and will therefore be specifically described at this point. To this end, attention is directed to the detail view in Fig. 4 wherein it will be seen that a relatively large pipe 13 is extended into each roller and terminates at about the center and this pipe constituting an outlet for the water which falls into the bottom of the rotating roller. While on this pipe, it is to be noted that that portion which extends through the left-hand end of the drum is rotatably mounted in the bearing in the adjacent supporting member 12 and thus constitutes a journal for this end of the roller. Proceeding, it is to be stated that a relatively smaller feed water pipe 13 extends through the pipe 12 and is provided on its inner end with a sprayer head 15 which is considerably long and sprays the cool water against that portion of the roller against which the hot glass flows. With this construction and arrangement it will be seen that a continuous circulation of water will be kept up during the rotation of the rollers and the latter will be kept in an exceedingly cool shape and the glass in turn will be readily cooled and eventually placed in condition for the final flattening steps as it passes through additional cooling rollers such as will be provided in practical use but which are not shown in the drawings. This leads me to state at this point that any number of additional rollers may be employed or a conveyor or other suitable means associated with the rollers 11 for carrying the glass sheet to a suitable point of discharge.

In operation it will be seen that the molten glass will be discharged into the chute through the opening 2 from the outlet O of the melting furnace F and will flow by gravity over the inner surface of the bottom of the inclined chute, the amount of liquid permitted to pass through the chute, being controlled by the valve 7 which is operated by hand. As the flowing mass encounters the baffles or deflectors 9, it is spread uniformly over the entire surface of the bottom of the chute and passes through the comb-like member 10 after which it is discharged through the outlet 3 in small jets. These jets merge into one another when contacting the cooling rollers 11 and flow between the latter in a sheet which is partially cooled and after passing between additional rollers, is cooled and flattened and cut into the desired sheets. Of course, as the molten glass passes through the chute, the flames from the jets play upon it and insure that it will be kept in a liquid state.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the subjoined claims may be resorted to if desired.

I claim:

1. A machine for making sheet glass comprising a chute provided with an inlet and with an outlet, and spaced deflectors secured to the bottom thereof and inside of the same for spreading the molten glass over the entire surface of the bottom before it is discharged from the chute and onto the cooling rollers.

2. A machine for making glass comprising a chute for the molten glass to pass through, said chute being formed at one end with an inlet and at its opposite end with a discharge opening, and a comb-like member secured to the chute adjacent the discharge opening for compelling the molten glass to pass through the discharge openings in small jets.

3. The structure set forth in claim 2, together with a plurality of deflectors arranged in advance of the comb-like member for insuring a uniform distribution of the glass over the entire surface of the bottom of the chute, and a valve arranged in the latter for controlling the flow of the glass.

In testimony whereof I have hereunto set my hand.

EDWARD GREGORY.